Patented Jan. 1, 1952

2,580,765

UNITED STATES PATENT OFFICE 2,580,765

METHOD AND COMPOSITION FOR TREATING WELLS

Elwin B. Hall, Los Angeles, Ernest F. Snyder, Long Beach, and Carl S. Seybold, Jr., Gardena, Calif.

No Drawing. Application January 7, 1949, Serial No. 69,844

3 Claims. (Cl. 252—8.55)

This invention relates to a composition and method for treating wells and is particularly concerned with the method and composition for the removal of all types of drilling fluid filter cake sheaths during completion of the well and for the removal of waxy masses or other detrimentally deposited materials which are normally encountered in petroleum production.

Waxy masses or "paraffin" is a term commonly applied in drilling and production practice and is a combination of precipitated and deposited mineral salts, oil, mud, silt, sand, water, gums and resins in an asphaltic matrix of "paraffin." Such waxy masses or "paraffin" may vary widely in composition ranging from a soft mushy liquid, through a plastic mass, to a hard granular solid. The composition and process of the present invention is designed to break down such detrimentally deposited materials or "paraffin" so as to allow them to accumulate in a place for removal from the well. Thus in one form of the process of the present invention after a well has been completed and has been placed on production with the result that such waxy masses or "paraffin" have been deposited so as to prevent adequate production, the well is treated as hereafter described for the removal of such "paraffin" or other detrimentally deposited materials and thereby the maximum productive capacity of the well restored.

The composition and process of the present invention is also utilized for the treatment of wells before they are placed on production. During the drilling of wells for oil and gas a drilling fluid is used to carry out cuttings and to lubricate the drilling bit. In addition, the drilling fluid plasters or deposits a tough, semiplastic sheath on the face of the hole which reduces the loss of fluid into the surrounding formation. Upon completion of the well and before placing it on production it is desirable that this deposited sheath of material be removed so that the formation will be restored to its natural permeability. The composition and process of this invention, by removing the drilling fluid sheath, increases the productivity of the well and allows for the production of fluid from the well with a smaller pressure draw down.

The waxy masses or "paraffin" which are encountered in petroleum production, or the sheaths of material deposited during the drilling of the well are removed by treating the well with the composition of the present invention. This composition consists of an aqueous solution containing disodium pyrophosphate or sodium acid pyrophosphate ($Na_2H_2P_2O_7$) and an anionic detergent and a nonionic detergent.

The particular sodium phosphate compound ($Na_2H_2P_2O_7$) is employed in the composition of the present invention since, in comparison with other phosphate compounds, this phosphate compound is found to have greater ability to deflocculate deposited drilling fluid sheaths and to decompose waxy masses, "paraffin" and other detrimentally deposited materials to be removed from the well. It has also been discovered that this particular phosphate compound has, as do the other polyphosphates, the ability to suppress precipitation of calcium or other compounds from water or connate water as it is known in wells.

In the application of the composition of the present invention it is generally true that should connate water be present in the well being treated the composition will mix to some extent therewith. This connate water, and in some instances, the water used in making the composition, are generally hard waters containing calcium compounds which are subject to precipitation on admixture with phosphate compounds. If such precipitation of the calcium compounds is permitted to take place such calcium compounds become precipitated or deposited in the pores of the formation of the well hole with the resulting loss of permeability of the formations of the well hole and the reduction of the productivity of the well.

A considerable part of the value of the present invention resides in this discovery, that the sodium acid pyrophosphate is effective in the composition to restrain such precipitation of calcium compounds from hard water.

The sodium acid pyrophosphate compound is employed in the composition of the present invention in the proportions of from one and one-half percent to five percent of the composition, or from five and one-fourth to seventeen and one-half pounds per barrel.

The composition also includes an anionic detergent. Such anionic detergents are employed in the composition for the reason that they are effective in acting upon resins and bituminous materials as well as "paraffin" and other detrimentally deposited materials to disintegrate or decompose such material, whereas without the presence of such surface active agent material the sodium phosphate compound is not as effective for disintegrating or decomposing many of the resinous and bituminous or other detrimentally deposited materials which are encountered in removing drilling fluid sheaths from a well before placing the well on production or which are formed during the production of the well. Particularly in the drilling of wells by the use of emulsion muds or through the use of oil base drilling fluids bituminous sheaths of material are deposited which are substantially impossible to adequately remove merely by treating the wells with solutions of phosphate compounds.

Heretofore detergents have not been employed in compositions containing sodium phosphate which are intended for treating wells for the reason that it has been heretofore found that their inclusion in the treating composition resulted in loss of permeability of the formations treated. The anionic detergents have a precipitating action on the calcium compounds contained in the water utilized in making the composition and with the connate or hard water normally encountered in the well bore on application of the composition with the result that such compounds are precipitated and deposited in the pores of the formation with consequent loss of permeability and damage to the well. This effect, however, is overcome in the composition of the present invention by the addition thereto of a nonionic detergent. Nonionic surface active agents are not precipitated by hard water, or by alkali earth or heavy metal salt solutions as compared with anionic surface active agents which can cause some precipitation even though of a similar degree of water solubility so that by the addition to the composition of the nonionic surface active agents the tendency of the anionic surface active agents employed to precipitate calcium compounds is suppressed, if not entirely eliminated, and it, therefore, becomes possible to include for their beneficial qualities such surface active agents in phosphate solutions used for treating wells without effecting a reduction in permeability of the formation of the well. In addition, the minimum temperature requirements for the complete solubility of the composition is greatly reduced or lowered by the addition thereto of the nonionic surface active agent.

In the composition of the present invention the anionic detergents may be employed in proportions of one percent to five percent of the aqueous composition, or three and one-half to seventeen and one-half pounds per barrel of aqueous mixture, while the nonionic detergents are preferably employed within the proportions of one-quarter percent to two percent of the composition, for from seven-eighths to seven pounds per barrel.

The anionic detergents which are used in the process and composition of the present invention include the sulfuric acid esters of fatty alcohols, sulfonaphthenates, sulfosuccinic acid esters, and the alkyl-aryl sulfonates. Of these anionic detergents we prefer to employ the alkyl-aryl sulfonates, or the alkali salts of such alkyl-aryl sulfonates which are generally in the form of either an alkyl sulfonated benzene or toluene, in which the alkyl group is mostly of a straight hydrocarbon chain having from eight to twenty carbon atoms, and preferably around twelve to fifteen carbon atoms. More specifically, we have employed such detergents as Oronite D-40, a preparation containing about forty percent of the alkyl-aryl sulfonate and sixty percent sodium sulfate, the alkyl-aryl sulfonate being sodium salts chiefly of pentadecyl benzene sulfonates, hexadecyl benzene sulfonates, heptadecyl benzene sulfonates and octadecyl benzene sulfonates.

The anionic detergent, however, may be of the class of sulfuric acid esters of fatty alcohols in which the alcohol group contained between eight and twenty carbon atoms, preferably from between twelve and sixteen. Thus, most commonly, the alkyl sulfate detergents are derived from such alcohols as lauryl, myristyl, palmityl and stearyl. For example, the detergent Aquarex-D has been employed which is a sodium salt of sulfated mono esters of high fatty alcohols, chiefly lauryl and myristyl derivatives. Dioctyl esters of sulfosuccinic acid likewise usually contains from eight to twenty carbon atoms in the alkyl-aryl chain and thus, for example, there may be used as an anionic detergent in the composition and process of the present invention an anionic detergent such as Aerosol O. T., which is substantially a dioctyl ester of sodium sulfosuccinic acid. The alkyl-aryl sulfonaphthenate detergents useful in the process of the present invention usually also contain from eight to twenty carbon atoms in the alkyl-aryl group. Thus, for example, there may be employed as an anionic detergent in the composition and process of the present invention a preparation consisting chiefly of sodium salts of pentadecyl naphthene sulfonate, hexadecyl naphthene sulfonate, heptadecyl naphthene sulfonate and octadecyl naphthene sulfonate, or mixtures thereof.

The nonionic detergents which are used in the composition of the process of the present invention are non-ionizable and owe their effectiveness to a proper balance between certain hydrophilic (polar) and lyophilic (non-polar) groups in their molecules. The hydrophilic character is usually obtained by the presence of a certain minimum of accumulated polar groups such as free hydroxy or ether-oxygen groups. The nonionic detergents include the partial esters of polyhydric alcohols with long chain carboxylic acids; the partial and complete esters of certain water soluble hydroxy-alkyl ethers of polyhydric alcohols with long chain carboxylic acids; the ethers of polyhydric alcohols with long chain fatty alcohols; short chain hydroxy-alkyl ethers of polyhydric alcohols esterified with long chain fatty alcohols; long chain alcohols with a number of free hydroxyl groups; esters of long chain alcohols with polyhydroxy acids; long chain acetals of polyhydric alcohols; condensation products of fatty acids with protein decomposition products, amides prepared from long chain amines and polyhydroxy acids.

Examples of the nonionic detergents used in the process and composition of the present invention are Triton X-100, which is an alkylated aryl poly-ether alcohol of substantially the following formula: polyethylene glycol mono iso octyl phenyl ether. Likewise, Levelene may be employed, which is a high molecular organic condensation product of the polyethylene type with a specific gravity of 1.0315 and a pH of 7.0.

Other nonionic detergents which have been used in the process and composition of the present invention include Glim, which is an ethylene oxide condensation product; Span 20, which is a sorbitan monolaurate; Tween 40, which is a polyoxyalkylene ether of partial palmitic acid ester; Antarox E-100, Antarox B-290 and Antarox A-200, which are polyglycol and polyglycol etheresters; Emcol #12, which is a fatty acid ester of a polyhydric alcohol, and Glaurin, which is a diethylene glycol monolaurate.

The composition of the present invention consists of an aqueous solution containing from one and one-half percent to five percent, preferably about three percent, sodium acid pyrophosphate from one percent to five percent, preferably about one and one-half percent anionic detergent, which may be of any of the detergents previously described, and from one-fourth percent to two percent, preferably about one-half percent of the nonionic detergents, including any of those in the classifications described.

We have tested compositions of substantially the above proportions using each of the anionic and nonionic detergents previously described. The composition within the limits of the above described ranges has a pH of 3.5 to 4.5 and a surface tension of around 28 to 30 dynes per centimeter at 20° C., and it is to these two properties that much of the effectiveness of the composition of the present invention is attributed. While sodium acid pyrophosphate is normally used in producing the composition of the present invention, it is, of course, possible in producing the composition to use other polyphosphates such as tetrasodium pyrophosphate and adjust the pH of the solution by the addition of phosphoric acid and arrive at a solution of the disodium pyrophosphate.

The following tests illustrate the importance of the composition of the present invention of including, along with the anionic detergents, a suitable proportion of the nonionic detergents. In the first tabulation appended below there is illustrated the extent of the precipitation at different temperatures of a composition prepared including three percent sodium acid pyrophosphate and one and one-half percent anionic detergent (Oronite D-40), the composition not including a nonionic detergent. In these tests the composition was made up using a particularly hard or connate water derived from an oil well high in precipitable calcium compounds and having a hardness of 1150 P. P. M. The different columns illustrate the percent of such connate water employed, the balance of the water used being distilled water. In the test operations the amount of calcium sulfonate precipitated was measured and listed at the different temperatures as a percent of the input dry solids:

| Temperature | Per Cent Connate Water | | | |
|---|---|---|---|---|
| | 20% | 30% | 40% | 50% |
| ° F. | | | | |
| 90 | 2.6 | 10.1 | 18.7 | 21.7 |
| 130 | .03 | .06 | 4.9 | 16.4 |
| 160 | .05 | .07 | 1.6 | 3.6 |
| 200 | .07 | .4 | 1.6 | 3.5 |

The following table illustrates a similar set of tests using the same connate water, the composition including, in addition to the sodium acid pyrophosphate, an anionic detergent (Oronite D-40) and one-half percent of a nonionic detergent, or Levelene:

| Temperature | Per Cent Connate Water | | | |
|---|---|---|---|---|
| | 20% | 30% | 40% | 50% |
| ° F. | | | | |
| 90 | .00 | .04 | .09 | 1.2 |
| 130 | .00 | .00 | .16 | .47 |
| 160 | .00 | .00 | .43 | .63 |
| 200 | .00 | .00 | 1.1 | .92 |

In treating a well using the composition of the present invention the sheaths or "paraffin" to be decomposed can be subjected to the action of the composition in various ways which will readily occur to those skilled in the art. For example, the composition may be circulated through the well or can be inserted in the well and the well then swabbed. It also may be spotted in the well hole opposite the sheathing or "paraffin" to be decomposed. The invention is useful where a liner of a well is to be treated for the removal of the sheathing either inside or exterior to the liner, in which case the composition is spotted at the liner and then the liner cleaned using any usual or preferred washer, including a pressure type washer. The pressure washer may then be removed and followed by the use of a suction washer. At the end of such washing operation, in addition to removal of decomposed or disintegrated detrimentally deposited materials, it will frequently be found possible to remove from the well hole fragments of "paraffin" or asphaltic sheathing, which fragments indicate there has been originally present a solid sheathing of a consistency of asphaltic concrete of a thickness of about three-eighths inch.

By the composition and process of the present invention resinous paraffin and asphaltic sheathing may be decomposed and removed so as to develop or restore to the well maximum productivity where, due to the use of previous compositions, such sheathings were substantially uneffected. Moreover, by the means of the present invention the action of detergent material is effected without the loss of permeability of the formation such as occurs with previous efforts to employ such detergents.

While the particular examples of the composition and method herein described are well adapted to carry out the objects of the invention, various modifications and changes may be made and this invention includes such modifications and changes as come within the scope set forth in the appended claims.

We claim:

1. A method of treating an oil or gas well comprising washing said well with an aqueous solution containing from one and one-half percent. to five percent. of sodium acid pyrophosphate, from one percent. to five percent. of an anionic non-soap detergent, and from one-fourth percent. to two percent. of a nonionic detergent so as to disintegrate sheathing present in said well, said aqueous solution having a pH of between 3.5 and 4.5.

2. A composition for treating an oil or gas well for the removal of deposits from said well, said composition comprising an aqueous solution containing from one and one-half percent. to five percent. of sodium acid pyrophosphate, from one percent. to five percent. of an anionic non-soap detergent, and from one-fourth percent. to two percent. of a nonionic detergent, the composition having a pH of three and one-half to four and a half.

3. A composition for treating a well to disintegrate deposits, said composition comprising an aqueous solution containing one and one-half percent. to five percent. of sodium acid pyrophosphate, from one percent. to five percent. of alkylaryl sulfonate detergent, and from one-fourth percent. to two percent. of a nonionic detergent, said composition having a pH of three and one-half to four and one-half.

ELWIN B. HALL.
ERNEST F. SNYDER.
CARL S. SEYBOLD, Jr.

REFERENCES CITED

The following references are of record in the file of this patent:

UNITED STATES PATENTS

| Number | Name | Date |
|---|---|---|
| 2,279,314 | Henderson | Apr. 14, 1942 |
| 2,322,484 | Stuart | June 22, 1943 |
| 2,342,656 | Frye et al. | Feb. 29, 1944 |

OTHER REFERENCES

"Non-Ionic Surface Active Agents" by Henry A. Goldsmith, reprint from "Chem. Industries," March 1943.